(12) United States Patent
Ivan et al.

(10) Patent No.: US 6,832,271 B1
(45) Date of Patent: Dec. 14, 2004

(54) SYSTEMS AND METHODS FOR MONITORING AND DISPLAYING I/O DATA FOR PLURALITY OF I/O DEVICES

(75) Inventors: Jason Ivan, San Jose, CA (US); James Zhou, Singapore (SG); Pamela Schure, Los Gatos, CA (US); Wai-Loong Lim, Menlo Park, CA (US); Claudia Truesdell, E. Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 10/155,814

(22) Filed: May 23, 2002

(51) Int. Cl.[7] .................................................. G06F 3/00
(52) U.S. Cl. ...................... 710/15; 345/704; 345/735; 345/736; 345/737; 709/223
(58) Field of Search .............................. 710/15, 16, 17, 710/18; 345/700

(56) References Cited

U.S. PATENT DOCUMENTS

2003/0101025 A1 * 5/2003 Shah et al. .................. 702/188
2003/0184580 A1 * 10/2003 Kodosky et al. ............ 345/734
2003/0184596 A1 * 10/2003 Kodosky et al. ............ 345/810

* cited by examiner

Primary Examiner—Jeffrey Gaffin
Assistant Examiner—Alan Chen
(74) Attorney, Agent, or Firm—IP Strategy Group, PC (57) ABSTRACT

A computer-implemented USB (Universal Serial Bus) monitoring and data displaying utility for monitoring and displaying information pertaining to a plurality of USB devices connected to a computer, the displaying being performed on a computer display screen communicably coupled to the computer, the information pertaining to the plurality of USB devices including status information pertaining to the plurality of USB devices. The USB utility includes a monitoring view implemented in a window of the computer display screen, the monitoring view including a set of condensed individual device information sections, each of the condensed individual device information sections displaying condensed information pertaining to one of the USB devices. The condensed information includes an identity of an associated USB device, and one of a hub identifier, a port identifier, and a data transfer indicator pertaining to the associated USB device, the hub identifier identifying a hub to which the associated USB device is currently connected, the port identifier identifying a port to which the associated USB device is currently connected, the data transfer indicator indicating whether data transfer currently takes place with respect to the associated USB device.

30 Claims, 4 Drawing Sheets

*Apple System Profiler (built into Apple's MacOS 9 and MasOS X*

FIG. 4

SYSTEMS AND METHODS FOR MONITORING AND DISPLAYING I/O DATA FOR PLURALITY OF I/O DEVICES

BACKGROUND OF THE INVENTION

The present invention relates to computer-implemented methods and apparatus for monitoring I/O status in a computer system. More particularly, the present invention relates to a USB status monitoring utility for monitoring status information pertaining to USB devices, hubs, and adapters in a computer system.

In the modern computer system, many different I/O devices may be connected to the system bus via a variety of hubs and adapters. By way of example, there exists in the industry a protocol known as USB (Universal Serial Bus), which governs how different devices in compliance therewith may be interconnected in a computer system. USB devices have rapidly gained wide acceptance in the market place because of their plug-and-play capability, as well as their hot-swappable capability. Consequently, there exists in the market place a wide variety of printers, disk drives, smart card readers, CD ROM's, computer mice, joysticks, and other I/O devices utilizing the USB protocol.

From the hardware perspective, the USB protocol vastly improves user-friendliness since devices employing the USB protocol require very little technical expertise to configure and to set up. In fact, many popular operating systems such as Windows™ by Microsoft Corporation of Redmond, Wash. and Mac-OS™ by Apple Computer of Cupertino, Calif. are even pre-loaded with USB drivers for a large number of USB devices, making the task of configuring a USB device for use even simpler for users.

From a software perspective, however, the same level of user-friendliness has not been found. Although the USB devices are easy to interconnect and set up, users often desire the ability to efficiently monitor, via software, the various USB devices connected to the computer system, to obtain easy-to-understand information regarding how the various USB devices are connected to the various hubs and adapters of the computer system (such as which USB device is connected to which port of which hub), and to obtain performance information pertaining to the connected USB devices.

To obtain status information pertaining to the connected USB devices, users nowadays typically resort to software utilities provided with the operating system, which are typically designed to provide operating system-level information for all classes of I/O devices. However, there are many shortcomings associated with these built-in utilities.

To further elaborate, consider the built-in utilities associated with two dominant operating systems: Windows Device Manager under the Windows™ operating system and Apple Systems Profiler under Apple Computer's Mac-OS9 and Mac OSX operating systems.

Figure 1:
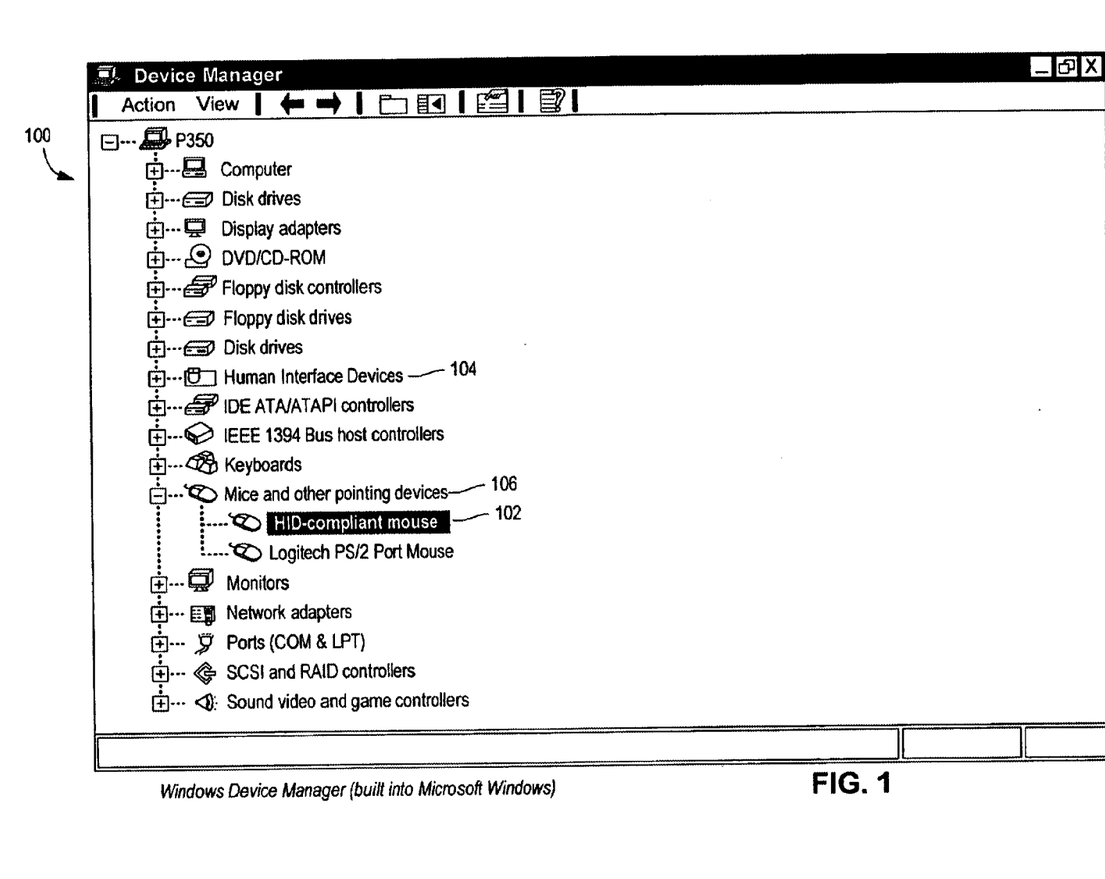
FIG. 1 is a prior art illustration of a window for displaying I/O device status information in a Windows-based computer system.

FIG. 1 is a prior art illustration of a window 100 for displaying I/O device status information in a Windows-based computer system. The Device Manager utility implemented by window 100 is typically activated through a series of steps starting with the user clicking on the START button under Windows, which brings up a menu from which the user can select the selection "SETTINGS." Selecting the selection "SETTINGS" brings up another list of selections from which the user may choose the selection "CONTROL PANEL," which further brings up another list of selections from which the user may choose the selection "SYSTEM PROPERTIES." By selecting the selection "SYSTEM PROPERTIES," yet another list of selections will appear from which the user may choose the selection "DEVICE MANAGER," thereby causing window 100 to appear.

Using the Windows-based Device Manager utility of FIG. 1, the user may click on individual selections to obtain more detailed information. For example, the user may select the "HID-compliant mouse" selection 102 to obtain further information about this human interface device mouse. The selection of HID-compliant mouse will bring up yet another window from which the user may view either the general information pertaining to HID-compliant mouse 102 (such as device type, manufacturer, hardware version) or driver information (such as driver provider, driver date, and digital signer, if any).

As can be appreciated from the foregoing, by drilling down the various selections under the Windows-based Device Manager utility, a lot of technical information pertaining to the I/O devices may be obtained. Although the Windows-based Device Manager utility of FIG. 1 appears to give quite detailed information about the various I/O devices attached to the associated Windows-based computer system, there are several drawbacks. For example, it is very difficult, if possible at all, to obtain the answer to questions such as how many USB devices are currently attached to this Windows-based computer system, which USB device is connected to which port of which hub, whether data transfer is currently taking place vis-à-vis a particular USB device, and whether the interconnection between USB devices and hubs are such that performance is optimized.

Furthermore, a user delving into the details of the various selections presented in window 100 may be provided with information that is redundant from selection to selection. For example, the information contained in HID-compliant mouse 102 is also shown under a Mouse selection, which is listed under selection Human Interface Devices 104, since HID-compliant mouse 102 is both a mouse (which causes it to be listed under the selection "MICE AND OTHER POINTING DEVICES" 106 as well as a human interface device, which causes that mouse 102 to also be listed under the selection "HUMAN INTERFACE DEVICES" 104.

The listing of a device under multiple tabs in window 100 makes the navigation confusing and the task of monitoring and obtaining information about the I/O devices connected with the associated Windows-based computer system logically difficult for the user to follow. Ironically, this is exactly counter to what the USB protocol was trying to provide: a simple, intuitive, user-friendly way to work with I/O devices.

Figure 2:
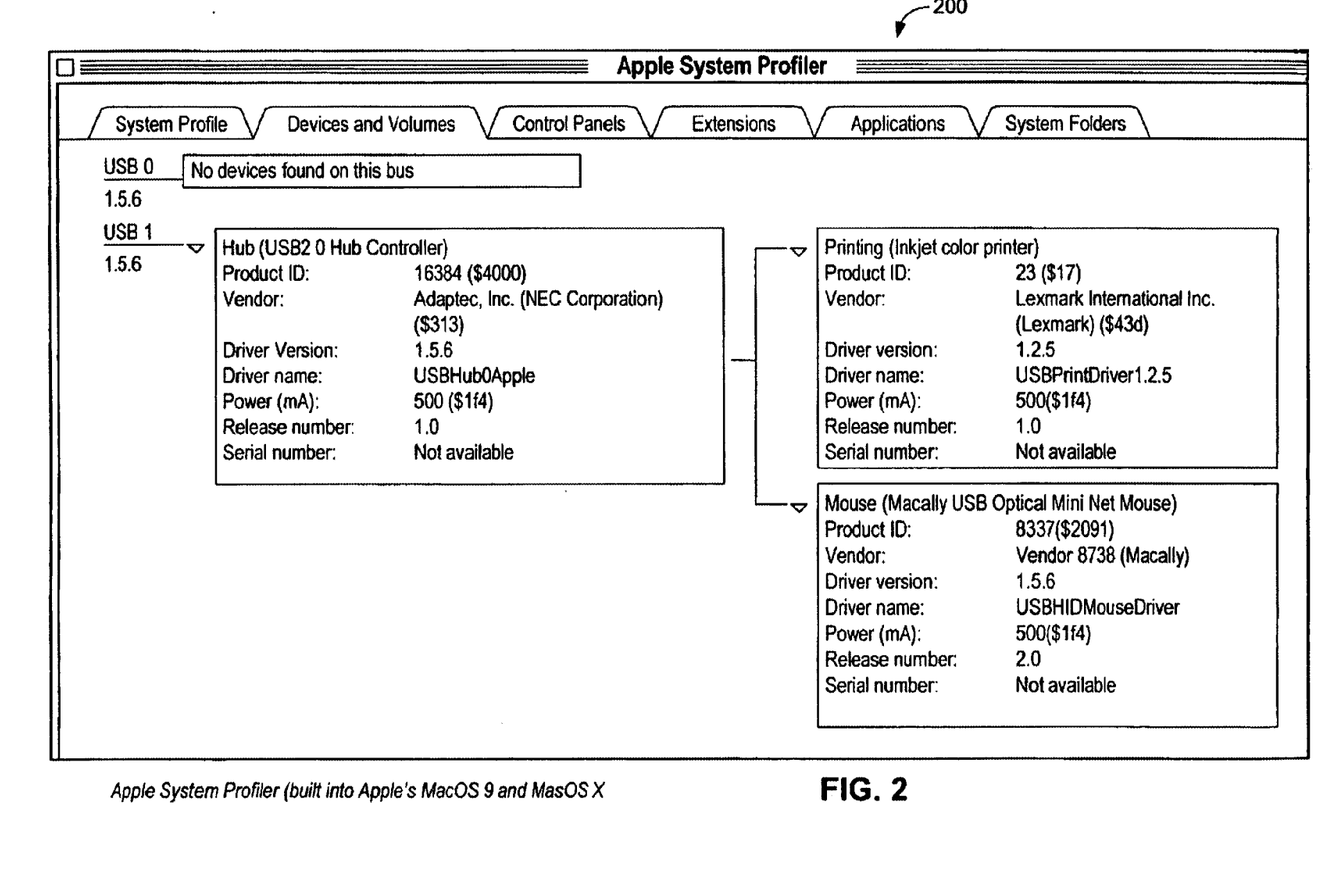
FIG. 2 shows a prior art window, which implements the utility Apple System Profiler for computers running Apple's MAC OS9 and MAC OSX operating systems.

The situation is a little better with Apple Computer's Mac-OS built-in utilities, but some fundamental problems remain. FIG. 2 shows a prior art window 200, which implements the utility Apple System Profiler for computers running Apple's MAC OS9 and MAC OSX operating systems. Using the Apple System Profiler utility, it is easier to obtain information pertaining to USB devices since they are displayed in a hierarchical tree format showing hubs and the various USB devices connected to each hub. Although the Apple System Profiler is navigationally and visually more user-friendly than the Windows Device Manager utility of FIG. 1, it is still very difficult, if possible at all, to obtain answers to some basic questions, such as which USB device is connected to which port of which USB hub, whether data transfer is currently taking place with respect to a particular USB device, and whether the interconnection between the USB devices and USB hubs in the associated computer system is optimal from a performance perspective.

These issues are important to computer users as USB devices become more available and accepted. Many computers already have multiple built-in USB adapters, and a power user may daisy-chain multiple USB hubs to each USB adapter, with multiple USB devices connected to each USB hub. In the absence of a software utility that can furnish information regarding which USB device is connected to which port of which hub, the only alternative for users is to crawl behind the computer desk and to physically trace each wire. This lack of information partially negates the hot-swappable and plug-and-play advantages provided by the USB devices.

Further, USB devices and hubs may come in different versions, each of which may have different levels of performance. For example, a hub or device conforming to USB specification 2.0 is expected to handle data 40 times faster than hubs and devices that conform to USB specification 1.1. When a fast USB device (e.g., one implementing USB 2.0) is plugged into a hub implementing USB 1.1, the performance of that fast USB device is effectively constrained by the speed of the hub to which it is connected. Unless the software utility can inform the user by some means of this mismatch, users often are not aware of the performance mismatch and may be unknowingly deprived of the ability to employ the higher speed associated with the faster USB device if there is in fact a faster USB hub port available in the system.

Furthermore, when a user works with multiple USB devices, that user may often wish to know whether data transfer currently occurs vis-à-vis a particular USB device. This is useful to assess performance or to troubleshoot problems, for example. Yet, with the existing utilities such as the Windows Device Manager of FIG. 1 or the Apple System Profiler of FIG. 2, the user could not easily tell whether data transfer is currently occurring with respect to any particular USB device. On some USB devices, there may be a status LED or a status display which the user can physically check to ascertain whether data transfer is occurring. However, this is cumbersome and inconvenient, requiring the user to physically move from the computer to the location where the USB device is physically located in order to read the built-in LED. Other USB devices may not be so equipped and, in those cases, absent a software utility that can furnish this information, the user often has to guess, rendering the troubleshooting and/or performance assessing task imprecise and difficult.

In view of the foregoing, there are desired intuitive, user-friendly methods and arrangements for displaying real time I/O status information and particularly real time USB status information pertaining to hubs, adapters, and devices in a computer system.

SUMMARY OF THE INVENTION

The invention relates, in one embodiment, to a computer-implemented USB (Universal Serial Bus) monitoring and data displaying utility for monitoring and displaying information pertaining to a plurality of USB modules connected to a computer, the displaying being performed on a computer display screen communicably coupled to the computer, the information pertaining to the plurality of USB modules including status information pertaining to the plurality of USB modules. The USB utility includes a monitoring view implemented in a first window of the computer display screen. The monitoring view includes a set of condensed individual module information sections, each of the condensed individual module information sections displaying condensed information pertaining to one of the USB modules. The condensed information includes an identity of an associated USB module, and one of a hub identifier, a port identifier, and a data transfer indicator pertaining to the associated USB module. The hub identifier identifies a hub to which the associated USB module is currently connected. The port identifier identifies a port to which the associated USB module is currently connected. The data transfer indicator indicates whether data transfer currently takes place with respect to the associated USB module.

The USB utility further includes at least one of a system view and a device view. The system view displays detailed information about the USB modules in a second window separate from the first window, information displayed in the system view having more details than information displayed in the monitoring view. The device view displays detailed information about a given one of the USB modules in one of the second window and a third window separate from the second window. Information displayed in the device view about the given one of the USB modules has more details than information pertaining the given one of the USB modules displayed in the monitoring view. The USB utility further includes an icon for invoking at least one of the system view and the device view from the monitoring view.

The invention relates, in another embodiment, to a computer-implemented USB (Universal Serial Bus) monitoring and data displaying utility for monitoring and displaying information pertaining to a plurality of USB devices connected to a computer, the displaying being performed on a computer display screen communicably coupled to the computer, the information pertaining to the plurality of USB devices including status information pertaining to the plurality of USB devices. The USB utility includes a monitoring view implemented in a window of the computer display screen, the monitoring view including a set of condensed individual device information sections, each of the condensed individual device information sections displaying condensed information pertaining to one of the USB devices. The condensed information includes an identity of an associated USB device, and one of a hub identifier, a port identifier, and a data transfer indicator pertaining to the associated USB device, the hub identifier identifying a hub to which the associated USB device is currently connected, the port identifier identifying a port to which the associated USB device is currently connected, the data transfer indicator indicating whether data transfer currently takes place with respect to the associated USB device.

In yet another embodiment, the invention relates to a computer-implemented USB (Universal Serial Bus) monitoring and data displaying utility for monitoring and displaying information pertaining to a plurality of USB modules connected to a computer, the displaying being performed on a computer display screen communicably coupled to the computer, the information pertaining to the plurality of USB modules including status information pertaining to the plurality of USB modules. The USB utility includes a system view configured for displaying information about the USB modules in a first window, including a device map showing each of the USB modules and interconnections among the USB modules, the device map including identification data for each of the USB modules and port identification data identifying ports to which the USB modules are connected. The USB utility further includes device view displaying detailed information about a given one of the USB modules in one of the first window and a second window separate from the first window, information displayed in the device view about the given one of the USB modules having more details than information pertaining the given one of the USB modules displayed in the system view, wherein the device view is configured to be invoked by a user of the computer system from the system view.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The invention relates, in one embodiment, to a method and apparatus for displaying real time I/O status information for a computer system. The I/O status information is deemed real time since it reflects current status information for the I/O adapters, hubs, and devices coupled to the computer system. As the term is employed herein, real time denotes that the information is current and may be updated periodically or constantly in an automatic manner without user intervention using data from the I/O modules themselves.

The inventive I/O data display system includes three main components: a monitoring view, a system view, and a device view. In a preferred embodiment, the monitoring view is implemented in a monitoring window while the system view and the device view are implemented in a different, separate window. However, it is contemplated that each of the monitoring view, device view, and system view may be implemented in a separate window, if desired.

The monitoring view is configured to display condensed I/O status information, which is intended to inform the user at a glance the most relevant information pertaining to the I/O devices, hubs, and adapters. For example, in a preferred embodiment, the monitoring view may provide information pertaining to the operating state of an I/O module (which term encompasses either a device, a hub, or an adapter) as well as identify the associated I/O module. The monitoring view may further identify of the hub as well as the port of the hub to which that I/O module is connected. The monitoring may also include a visual indication of whether data transfer is currently taking place with the associated I/O module. However, depending on implementation, the amount of information displayed per I/O module may be greater or less than those discussed.

The monitoring view preferably can display the condensed I/O status information for multiple I/O modules. However, it is preferable that the I/O information displayed in the monitoring view be in a condensed format and limited to only the essential information in order to allow the monitoring view to be implemented in as small a window as possible, thereby encouraging the user to keep the monitoring view open and available at a glance on the computer display screen.

If the user desires additional details regarding the interconnections among the I/O modules, the system view may be provided. In a preferred embodiment, the monitoring view includes an icon to allow the user to launch the window that implements the system view. Generically speaking, the system view displays system-level status information for the interconnected I/O modules. For example, in a preferred embodiment, the system view may include a diagram showing how the I/O devices, hubs, and adapters are interconnected in the computer system. The system view may contain additional information such as the identity of the ports and the I/O devices connected to those ports. The system view may also provide visual indications to alert the user to the possibility of performance mismatch between an I/O device and an I/O hub or I/O adapter to which that I/O device is connected.

The device view, on the other hand, presents detailed information pertaining to a selected I/O device. Detailed information pertaining to a particular device, such as the manufacturer, the protocol employed by the I/O device for communication, and the identity of the hub and port to which the selected I/O device is connected, is provided in the device view. Furthermore, advanced information such as hardware information, power information, and driver information for the selected I/O device may also be presented in the device view.

By presenting the I/O information in a condensed format in the monitoring view and providing a means for the user to obtain more detailed system-level information (via the system view) or more detailed device information (via the device view), the inventive I/O data display system addresses the shortcomings of prior art utilities by allowing the user to ascertain, in a user-friendly and intuitive manner, many important basic and detailed information regarding the I/O devices connected to the computer system.

Figures 3, 5:
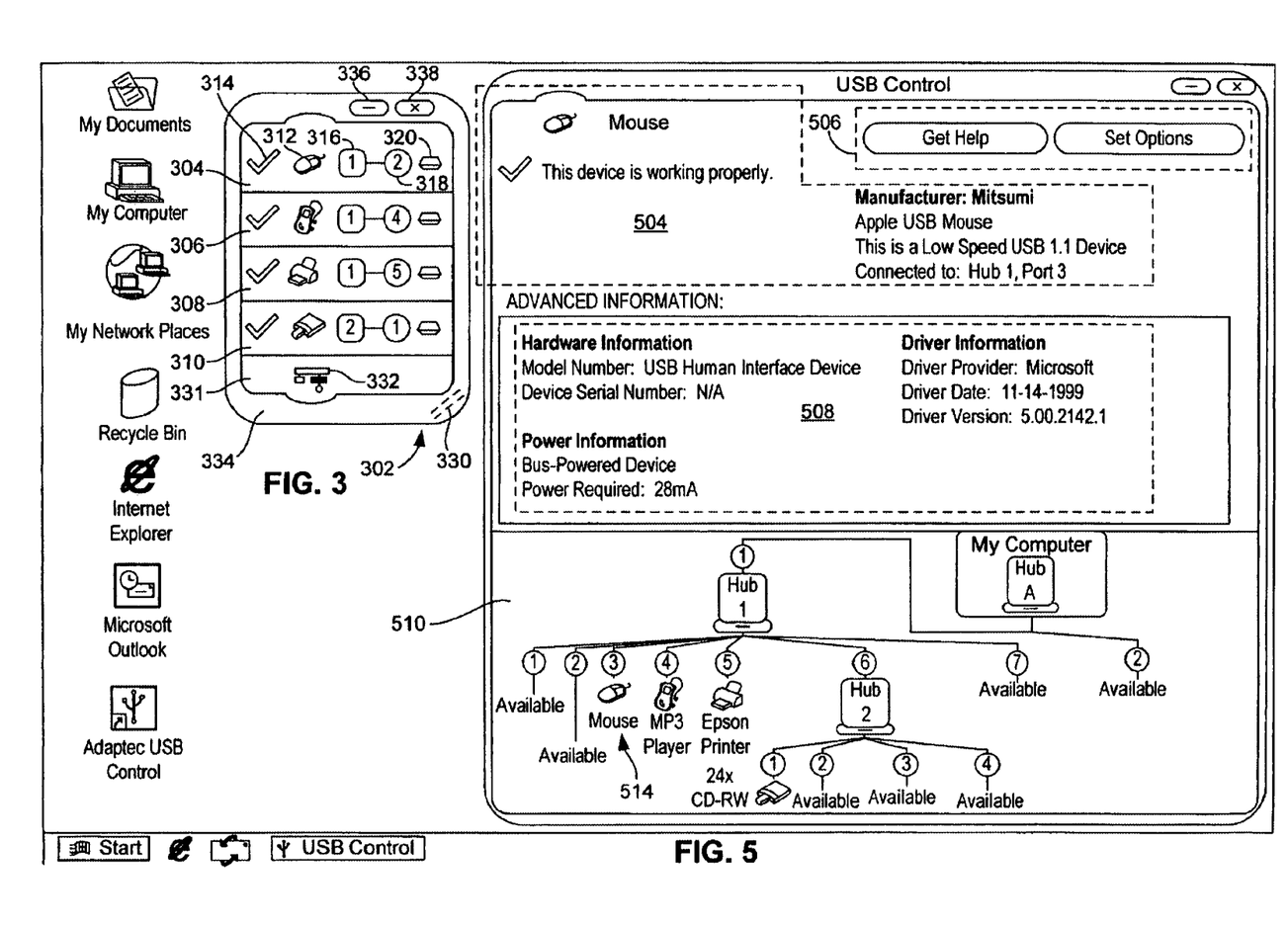
FIG. 3 illustrates, in accordance with one embodiment of the present invention, a window for implementing the monitoring view for USB modules in a given computer system.
FIG. 5 shows, in accordance with one embodiment of the present invention, a device view.

To further elaborate on the advantages and features of the present invention, FIG. 3 illustrates a window 302, representing the window for implementing the monitoring view for USB modules in a given computer system. In the examples herein, the USB protocol is a preferred implementation and is employed to facilitate ease of discussion and illustration. However, it should be noted that the principles and techniques disclosed may apply equally to other protocols.

Referring to FIG. 3, there is shown a plurality of condensed individual module information sections 304, 306, 308, and 310 within the monitoring view of window 302.

Each of condensed individual module information sections 304–310 provides condensed I/O information pertaining to one of the I/O modules. In this case, the monitoring view implemented by window 302 provides condensed information for individual USB devices. The number of modules connected to the computer system may be obtained by enumerating the USB devices through an appropriate API, such as that provided by Microsoft Corporation for the Windows operating system. If desired, condensed information pertaining to hubs and adapters may be provided in the monitoring view as well. An exemplary API is provided below in Listing 1.

DeviceIoControl (

Handle hDevice, // handle to device

DWORD dwIoControlCode, // operation

LPVOID lpInBuffer, // input data buffer

DWORD nInBufferSize, // input data buffer size

LPVOID lpOutBuffer, // output data buffer

DWORD nOutBufferSize, // output data buffer size

LPDWORD lpBytesReturned, // byte count

LPOVERLAPPED lpOverlapped // overlapped information);

The function returns non-zero if it is successful. Otherwise, it returns zero. To get extended error information, GetLastError function is called.

To support the monitoring/data display utility, operations for the following IOCTLs are implemented in the device driver:

IOCTL_USB_GET_ROOT_HUB_NAME

IOCTL_USB_GET_NODE_INFORMATION

IOCTL_USB_GET_NODE_CONNECTION_INFORMATION

IOCTL_USB_GET_DESCRIPTOR_FROM_NODE_CONNECTION

IOCTL_USB_GET_NODE_CONNECTION_NAME

IOCTL_USB_GET_NODE_CONNECTION_DRIVERKEY_NAME

Listing 1: Exemplary API for Enumerating USB Devices

The DeviceIoControl function provides a device input and output control (IOCTL) interface through which an application can communicate directly with a device driver. The DeviceIoControl function is a general-purpose interface that can send control codes to a variety of devices. Each control codes represents an operation for the driver to perform.

The Win32 application triggers the IOCTL operation through the DeviceIoControl function call. Further information pertaining to how the above API may be employed may be found in a sample application entitled "usbview" which is supplied with Microsoft's DDKs (Device Driver Kits) for the Windows operating system.

Within condensed individual module information section 304, for example, there are a plurality of icons and other visual indicators designed to provide the user with easy-to-understand and intuitive information pertaining to the operational and interconnection status of a USB mouse (identified by reference number 312). Icon 312 may be provided automatically to the user from the information gathered from the USB devices themselves, or if the USB device description is not available, a generic icon may be provided and the user may be given an option to select an appropriate icon to represent the USB device associated with a particular condensed individual module information section.

In addition to the icons identifying the USB device associated with a given condensed individual module information section, a condensed individual module information section may also include an operating state indicator 314, a hub identifier 316, a port identifier 318, and a data transfer indicator 320. Operating state indicator 314 may assume one of three different states: satisfactory, unsatisfactory, and acceptable but non-optimized. Each of these states may be represented by an appropriate visual indicator. In condensed individual module information section 304, for example, the operating state indicator is a checkmark, indicating that the USB mouse associated with condensed individual module information section 304 is operating satisfactorily. The unsatisfactory operating state may be indicated to the user via an appropriate visual indicator such as a red exclamation point or a similarly suitable visual indicator, while the acceptable but non-optimized state may be indicated to the user by an appropriate visual indicator such as an orange asterisk or a similarly suitable visual indicator. A USB device may be deemed to operate unsatisfactorily if, for example, it draws an excessive amount of current or if there is no response from the USB device. A USB device may be operating in an acceptable but non-optimized state when, for example, a fast USB device is connected to, and has its performance constrained by, a slower hub.

Hub identifier 316 identifies the hub to which the USB device associated with condensed individual module information section 304 is connected. Port identifier 318 identifies the port of the hub identified by hub identifier 316 to which the USB device is connected. The hub identifier and port identifier values may be obtained through the use of the aforementioned API, for example.

Data transfer indicator 320 is a visual indicator that indicates to the user whether data transfer currently occurs vis-à-vis the USB device associated with condensed individual module information section 304. In a preferred embodiment, a filter driver intercepts all transfers from all devices and identifies data transfer associated with the USB device of condensed individual module information section 304. A high rate of data transfer may be represented by a rapidly flickering data transfer indicator 320, while a slower data transfer rate may be represented by a slower rate of flicker. If no data is transferred, data transfer indicator 320 may, for example, stay unlit or assume a previously defined color.

It is highly preferable that the monitoring view of window 302 contains relatively few data items associated with each USB module since the monitoring view is meant to be kept open as much as possible on the display screen of the computer system to allow the user to monitor at all times the status of the various USB modules. In one embodiment, the user may be allowed to elect, via a preference setting, to omit one or more of the indicators shown in each condensed individual module information section. For example, a user may only wish to monitor whether data transfer occurs with respect to a given USB device and may elect to omit the port identifier and/or the hub identifier.

Furthermore, window 302 can be resized so that the number of condensed individual module information sections may be varied. For example, the user may only wish to monitor the status information associated with the USB printer of condensed individual module information section 308. In this case, the user may move condensed individual module information section 308 to the top of window 302 so that when window 302 is minimized via resize icon 330, only condensed individual module information section 308 is shown.

Window 302 also shows a detailed view icon 332. The user might click on detailed view icon 332 to access other views such as the device view or the system view. In a preferred embodiment, both the device view and the system view are implemented in a single physical window and, thus, only a single detailed view icon 332 is provided within the monitor view of window 302. However, it is possible that the other two detailed views (e.g., the device view and the system view) may be implemented by two physically separate windows and, thus, two separate detailed view icons 332 may be provided within the monitor view of window 302.

In a preferred embodiment, the monitoring view window 302 is designed such that it occupies as little space as possible on the display screen. Again, this is to encourage the user to keep the monitoring view visible at all times to allow the user to have a ready means to monitor the I/O status of the USB module. For example, in the example of FIG. 3, the monitor view of window 302 does not show the status of any hub or adapter to minimize space usage but it is possible to do so in other embodiments. Thus, the monitor view preferably employs graphical elements and icons to represent data in a manner that is both user-friendly and intuitive, as well as taking up as little space as possible. The monitoring view can also be made to float atop all other windows of the display screen if desired To further reduce the real estate impact of monitoring window 302 within the computer display screen, in one embodiment of the present invention, even the window border disappears once the user moves the mouse away from the monitor view of window 302. With reference to FIG. 3, if the user moves the mouse off window 302, window border 334 disappears. Thus, when the mouse moves over the area within window 302 inside border 334, the monitoring view gets a notification and paints window border 334 on the display screen. When the mouse moves off window 302, a thinner border is painted or the thicker window border 334 is simply removed. As the term is employed herein, the window border denotes the region surrounding the window that is normally employed to visually delineate the window and to provide an area to implement tools that control the visual presentation of the window, such as minimize icon 336, close icon 338, and the aforementioned resize icon 330. Since these tools and the window border do not contain information associated with USB modules, removing window border 334 does not negatively impact the ability of the monitor view to provide condensed I/O status information to the user.

In one embodiment, each USB module is polled to ascertain the performance characteristic associated with that USB module. For example, USB hubs, adapters, and devices nowadays may implement either the well-established USB 1.1 specification or the faster USB 2.0 specification. This information may be obtained from, for example, the device descriptor, which is part of the USB specification, and can be obtained from the USB modules themselves. Using an appropriate visual indicator (such as color or shape) associated with hub identifier 316, port identifier 318, or device icon 312, the performance characteristics of the USB device and the hub and/or port to which it is connected may be visually represented so that the user can quickly tell at a glance whether there is a performance mismatch between, for example, a slower USB device and a faster USB hub and/or port (which does not allow the faster Hub/port to deliver data up to its potential) or a faster USB device and a slower hub and/or port (which effectively constrains the performance of the higher speed USB device). Furthermore, the monitor view allows the user to ascertain at a glance which device connects to which port of which hub of the computer system.

As can be appreciated from the forgoing, the monintoring view presents the user with a compact, visually attractive, and intuitive view from which the user can easily tell which USB device connects to which port, as well as can tell at a glance whether there's a performance mismatch associated with any of the USB devices, whether data transfer is currently occurring vis-à-vis a particular USB device and can even tell by the rate of flicker, for example, how fast data transfer is occurring.

Figure 4:
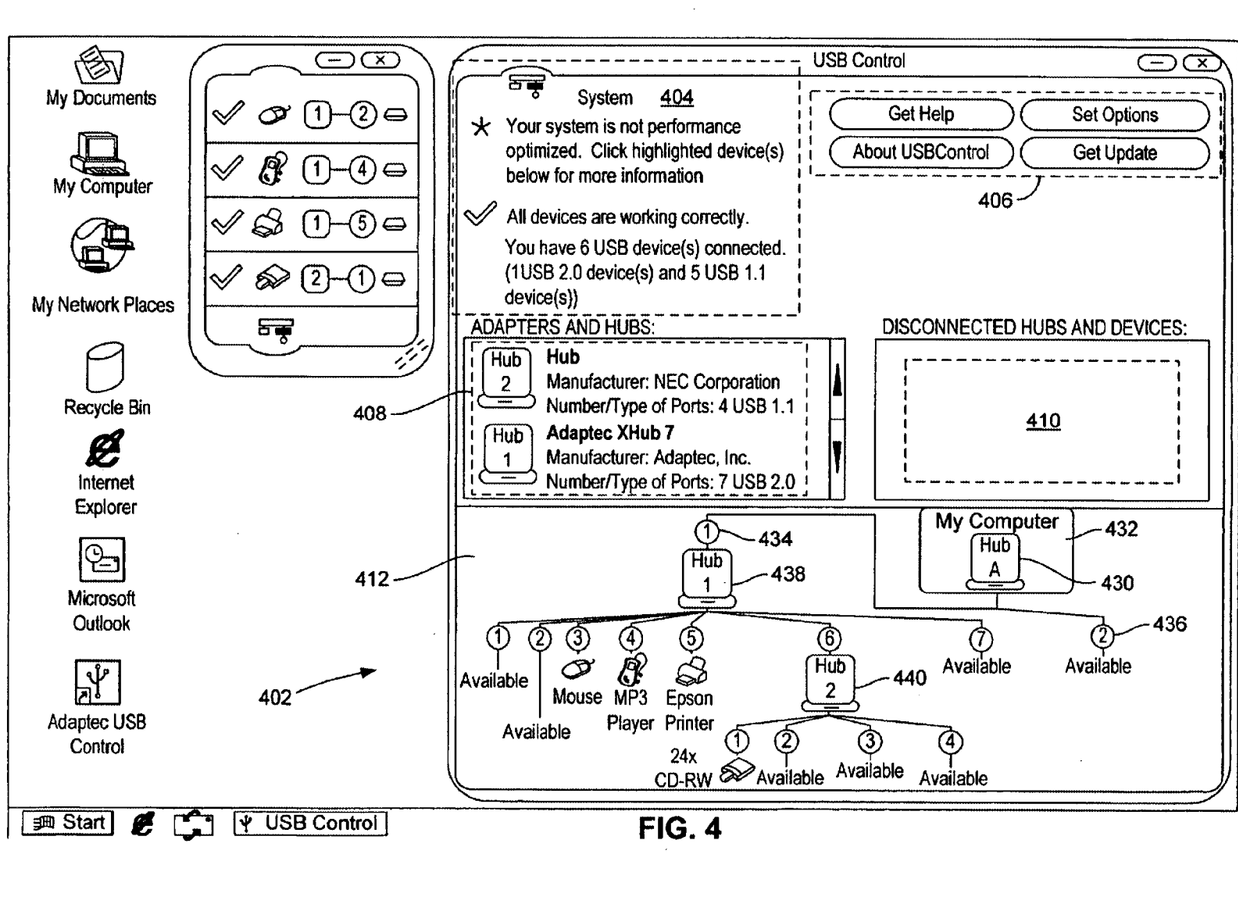
FIG. 4 shows, in accordance with one embodiment of the present invention, a system view displaying system-level status information pertaining to the interconnected USB devices, hubs, and adapters of the computer system.

FIG. 4 shows, in a window 402, a system view displaying system-level status information pertaining to the interconnected USB devices, hubs, and adapters of the computer system. The system view generally provides a meta view of the interconnected USB modules at the system level. As shown in FIG. 4, a system view of window 402 includes a summary section 404, a control section 406, an adapters and hubs information section 408, a disconnected hubs and devices information section 410, and a device map region 412.

Summary section 404 provides summary status information for the interconnected USB devices, hubs, and adapters as a whole. For example, the information in summary section 404 may quickly indicate whether the system is optimized (i.e., with no significant performance mismatch), whether all devices are working correctly, and a summary of the number of USB devices connected as well as the performance characteristics associated with the connected USB devices. Although summary section 404 in FIG. 4 is in a textual format, the same information may also be presented to the user using graphical or icon elements, if desired.

Control section 406 implements various controls associated with the inventive I/O data display system. Accordingly, various selections in control section 406 permit the user to obtain help, set preferences or options, obtain information pertaining to the version number of the utility program, as well as get any necessary updates. Connected adapters and hubs information section 408 presents detailed information such as manufacturer, number and type of port, and the like associated with the connected adapters and hubs. The information may be presented in a list form and scroll bars may be provided to permit the user to sequentially view each hub or adapter connected. Disconnected hubs and devices information section 410 present information pertaining to any hub or device previously connected to the computer system, but are now no longer connected. This information allows the user to ascertain at a quick glance whether any particular USB hub or device has been unintentionally disconnected, for example.

Device map region 412 displays in a hierarchical tree format the interconnections among the USB devices, hubs, and adapters of the computer system. Thus, in device map region 412 of the exemplary computer of FIG. 4, the root adapter or hub 430 in computer system 432 is shown having two ports: port 1 (434) and port 2 (436). Port 1 (434) of root hub 430 is connected to hub 1 (438), which itself has seven ports as shown. Ports 1, 2, and 7 of hub 1 (438) are shown to be available while port 3, 4, and 5 are connected to a USB mouse, a USB MP3 player, and a USB Printer, respectively. Port 6 of hub 1 (438) is shown connected to hub 2 (440) in a cascaded fashion. Hub 2 (440) itself has four ports and the device map further shows the various devices connected to the ports of hub 2 (440).

The information in summary sections 404, 408, and in device map region 412 may be obtained by enumerating the USB devices through the API's of the operating system (such as Microsoft Windows) as discussed earlier in connection with the monitoring view. If the device map is larger than the available display area, as in the case of FIG. 4, the user may be able to scroll down by moving the mouse off window 402 toward the bottom of the screen, for example, to scroll the device map upwards to allow the user to use the desired section of the device map. The same scrolling may be accomplished via scroll bars as well.

In device map region 412, appropriate visual indicators may also be provided to furnish the user with performance information associated with individual device, hub, or adapter. For example, through the use of color or shape, the speed of an individual device, hub, and/or adapter may be shown to the user, thereby enabling the user to ascertain at a glance if there is a performance mismatch (as in the case mentioned earlier of a fast device being connected to a slower hub and, thus, having its performance constrained thereby).

As can be appreciated from the foregoing, the information provided is highly useful to the user in monitoring and managing the USB devices, hubs, and/or adapters. Through the system view, the user can quickly ascertain by reviewing the information in summary section 404 or by looking at the device map in device map region 412, the number of USB devices connected, the performance associated with each USB device, whether there is a performance mismatch, which USB device is being connected to which port of which hub or adapter, and the like, all of which are difficult if not impossible to obtain using the prior art monitoring utility. By providing the user with, for example, information pertaining to which device is connected to which port in which hub (via either the device map or the monitoring view), the user is able to manage the physical interconnections and quickly plug and unplug devices from hubs without having to physically trace the wire, which may be physically located behind a desk, under a floor, or otherwise inconvenient to get to.

The device view is provided when the user wishes to obtain more detailed information pertaining to any particular device. For example, the user may be able to click on the mouse displayed either in device map region 412 or the monitoring view of FIG. 3, to obtain the device view. FIG. 5 shows a device view in a window 502. Window 502 includes four major sections: a device summary section 504, a control section 506, an advanced information section 508, and a device map section 510.

Device summary section 504 includes information identifying the USB device for which detailed information is currently displayed. Other summary information such as whether the device is working properly, the manufacturer information, the performance information (e.g., low speed, high speed, USB version), the hub number and port number to which the USB is connected, and the like are also displayed in device summary section 504. Control section 506 includes the buttons for help and options (or preference) setting, which facilitates contextual option setting, as well as other control-type buttons.

Other options include allowing the user to specify whether the I/O data display utility should be automatically launched upon system start-up, whether the monitoring view of FIG. 3 should always be kept on top of other windows. The user can also set the options such that the I/O data display system will be launched automatically if a USB-related error occurs with respect to any of the connected USB device, hub, and/or adapter. The user can also set the options such that the I/O data display system only gets launched and/or alerts the user with a USB-related error if an error having at least a specified intensity occurs.

Advanced information section 508 provides detailed information about the USB device. In this case, since the USB devices at issue is USB mouse 514 (as shown by the highlighting in the device map of device map section 510), advanced information section 508 may contain information such as the hardware information (including the model number and/or the device serial number), the driver information (including, for example, the driver provider, the driver date, and/or the driver version), and the power usage information (including, for example, whether the device is powered by the bus and the amount of power required and/or power currently drawn by the device).

In the preferred embodiment, the system view and the device view share the same window and the same device map. However, it is contemplated that the device view and the system view may be provided via different windows and an additional window may be launched to display the device view whenever, for example, the user clicks on a device in the device map section of the system view.

As can be appreciated from the foregoing, the inventive I/O data display system provides an integrated monitoring tool for allowing the user to monitor in a relatively unobtrusive manner and at all times, via the monitoring view, status information pertaining to the connected I/O devices. Furthermore, the information is presented in a highly graphical and intuitive manner, enabling the user to ascertain at a glance important status information such as the number of I/O devices connected, the types of device connected, the hubs and ports employed, the performance information associated with the hubs, ports, and devices, whether the devices are operating correctly, whether performance is optimal, and even whether data transfer currently takes place with respect to any particular I/O device. Since the monitoring view is connected to the system view and the device view in the integrated monitoring environment, navigation among these windows is also intuitive for the user to understand should the user desire to obtain more detailed information either at the system level or the device level. Like the monitoring view, the information in these system and device views is also highly graphical and intuitive, thereby improving user-friendliness and useability.

Thus, while this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented USB (Universal Serial Bus) monitoring and data displaying utility for monitoring and displaying information pertaining to a plurality of USB modules connected to a computer, said displaying being performed on a computer display screen communicably coupled to said computer, said information pertaining to said plurality of USB modules including status information pertaining to said plurality of USB modules, comprising:

a monitoring view implemented in a first window of said computer display screen, said monitoring view including a set of condensed individual module information sections, each of said condensed individual module information sections displaying condensed information pertaining to one of said USB modules, said condensed information including an identity of an associated USB module, and one of a hub identifier, a port identifier, and a data transfer indicator pertaining to said associated USB module, said hub identifier identifying a hub to which said associated USB module is currently connected, said port identifier identifying a port to which said associated USB module is currently connected, said data transfer indicator indicating whether data transfer currently takes place with respect to said associated USB module;

at least one of a system view and a device view, said system view displaying detailed information about said USB modules in a second window separate from said first window, information displayed in said system view having more details than information displayed in said monitoring view, said device view displaying detailed information about a given one of said USB modules in one of said second window and a third window separate from said second window, information displayed in said device view about said given one of said USB modules having more details than information pertaining said given one of said USB modules displayed in said monitoring view; and an icon for invoking at least one of said system view and said device view from said monitoring view.

2. The computer-implemented utility of claim 1 wherein said condensed information pertaining to said one of said USB modules further includes an operating status indicator having at least two states: a satisfactory state and an unsatisfactory state, said satisfactory state indicating that said one of said USB modules operates satisfactorily, said unsatisfactory state indicating that said one of said USB modules operates unsatisfactorily.

3. The computer-implemented utility of claim 2 wherein said operating status indicator further includes a non-optimized state, said non-optimizized state indicating that said one of said USB modules being connected with a port operating at a higher speed than a speed of said one of said USB modules.

4. The computer-implemented utility of claim 3 wherein said condensed information pertaining to said one of said USB modules includes one of said port identifier and said hub identifier.

5. The computer-implemented utility of claim 3 wherein each of said identity of said associated USB module and said one of said port identifier and said hub identifier assumes one of two colors: a first color indicating a first operating speed and a second color indicating a second operating speed different from said first operating speed.

6. The computer-implemented utility of claim 5 wherein said condensed information pertaining to one of said USB modules includes said data transfer indicator.

7. The computer-implemented utility of claim 1 wherein said condensed information pertaining to one of said USB modules includes said port identifier.

8. The computer-implemented utility of claim 1 wherein said condensed information pertaining to one of said USB modules includes said data transfer indicator.

9. The computer-implemented utility of claim 8 wherein said data transfer indicator has a variable flicker rate, said variable flicker rate includes a fast flicker rate indicating a fast data transfer and a slow flicker rate indicating a slow data transfer.

10. The computer-implemented utility of claim 1 wherein each of said hub identifier, said port identifier, and said data transfer indicator is represented by a graphical icon.

11. The computer-implemented utility of claim 1 wherein said plurality of USB modules includes at least one of a set of USB devices and a set of USB hubs, each of said set of condensed individual module information sections displaying information for one of said set of USB devices.

12. The computer-implemented utility of claim 1 having both said system view and said device view, said system view including means for invoking said device view from said system view.

13. The computer-implemented utility of claim 1 wherein both said system view and said device view are implemented in said second window in an alternate manner, said means for invoking said device view from said system view including invoking said device view for a particular USB module if said particular USB module is selected by a user when said particular USB module is displayed in said system view.

14. A computer-implemented USB (Universal Serial Bus) monitoring and data displaying utility for monitoring and displaying information pertaining to a plurality of USB devices connected to a computer, said displaying being performed on a computer display screen communicably coupled to said computer, said information pertaining to said plurality of USB devices including status information pertaining to said plurality of USB devices, comprising:

a monitoring view implemented in a window of said computer display screen, said monitoring view including a set of condensed individual device information sections, each of said condensed individual device information sections displaying condensed information pertaining to one of said USB devices, said condensed information including an identity of an associated USB device, and one of a hub identifier, a port identifier, and a data transfer indicator pertaining to said associated USB device, said hub identifier identifying a hub to which said associated USB device is currently connected, said port identifier identifying a port to which said associated USB device is currently connected, said data transfer indicator indicating whether data transfer currently takes place with respect to said associated USB device.

15. The computer-implemented utility of claim 14 wherein said condensed information pertaining to said one of said USB devices further includes an operating status indicator having at least two states: a satisfactory state and an unsatisfactory state, said satisfactory state indicating that said one of said USB devices operates satisfactorily, said unsatisfactory state indicating that said one of said USB devices operates unsatisfactorily.

16. The computer-implemented utility of claim 15 wherein said operating status indicator further includes a non-optimized state, said non-optimizized state indicating that said one of said USB devices being connected with a port operating at a higher speed than a speed of said one of said USB devices.

17. The computer-implemented utility of claim 16 wherein said condensed information pertaining to said one of said USB devices includes one of said port identifier and said hub identifier.

18. The computer-implemented utility of claim 16 wherein each of said identity of said associated USB device and said one of said port identifier and said hub identifier assumes one of two colors: a first color indicating a first operating speed and a second color indicating a second operating speed different from said first operating speed.

19. The computer-implemented utility of claim 18 wherein said condensed information pertaining to one of said USB devices includes said data transfer indicator.

20. The computer-implemented utility of claim 14 wherein said condensed information pertaining to one of said USB devices includes said port identifier.

21. The computer-implemented utility of claim 14 wherein said condensed information pertaining to one of said USB devices includes said data transfer indicator.

22. The computer-implemented utility of claim 21 wherein said data transfer indicator has a variable flicker rate, said variable flicker rate includes a fast flicker rate indicating a fast data transfer and a slow flicker rate indicating a slow data transfer.

23. The computer-implemented utility of claim 14 wherein each of said hub identifier, said port identifier, and said data transfer indicator is represented by a graphical icon.

24. A computer-implemented USB (Universal Serial Bus) monitoring and data displaying utility for monitoring and displaying information pertaining to a plurality of USB modules connected to a computer, said displaying being performed on a computer display screen communicably coupled to said computer, said information pertaining to said plurality of USB modules including status information pertaining to said plurality of USB modules, comprising:

a system view configured for displaying information about said USB modules in a first window, including a device map showing each of said USB modules and interconnections among said USB modules, said device map including identification data for each of said USB modules and port identification data identifying ports to which said USB modules are connected; and a device view displaying detailed information about a given one of said USB modules in one of said first window and a second window separate from said first window, information displayed in said device view about said given one of said USB modules having more details than information pertaining said given one of said USB modules displayed in said system view, wherein said device view is configured to be invoked by a user of said computer system from said system view.

25. The computer-implemented utility of claim 24 wherein a first USB module of said USB modules displayed in said system view is associated with an operating status indicator having at least two states: a satisfactory state and an unsatisfactory state, said satisfactory state indicating that said first USB module operates satisfactorily, said unsatisfactory state indicating that said first USB module operates unsatisfactorily.

26. The computer-implemented utility of claim 25 wherein said operating status indicator further includes a non-optimized state, said non-optimizized state indicating that said first USB module is currently connected with a port operating at a higher speed than a speed of said first USB module.

27. The computer-implemented utility of claim 24 wherein each of said identification data for said each of said USB modules and said port identification assumes one of two visual indicators: a first visual indicator indicating a first operating speed and a second visual indicator different from said first visual indicator, said second visual indicator indicating a second operating speed different from said first operating speed.

28. The computer-implemented utility of claim 27 wherein said first visual indicator is a first color, said second visual indicator is a second color different from said first color.

29. The computer-implemented utility of claim 24 wherein both said system view and said device view are implemented in said first window in an alternate manner.

30. The computer-implemented utility of claim 24 wherein said device view for said given one of said USB modules is invoked if a user selects said given one of said USB modules when said given one of said USB modules is displayed in said system view.

* * * * *